Oct. 15, 1940.  J. F. COPPEDGE  2,218,420
LEADING IRON
Filed Nov. 30, 1939
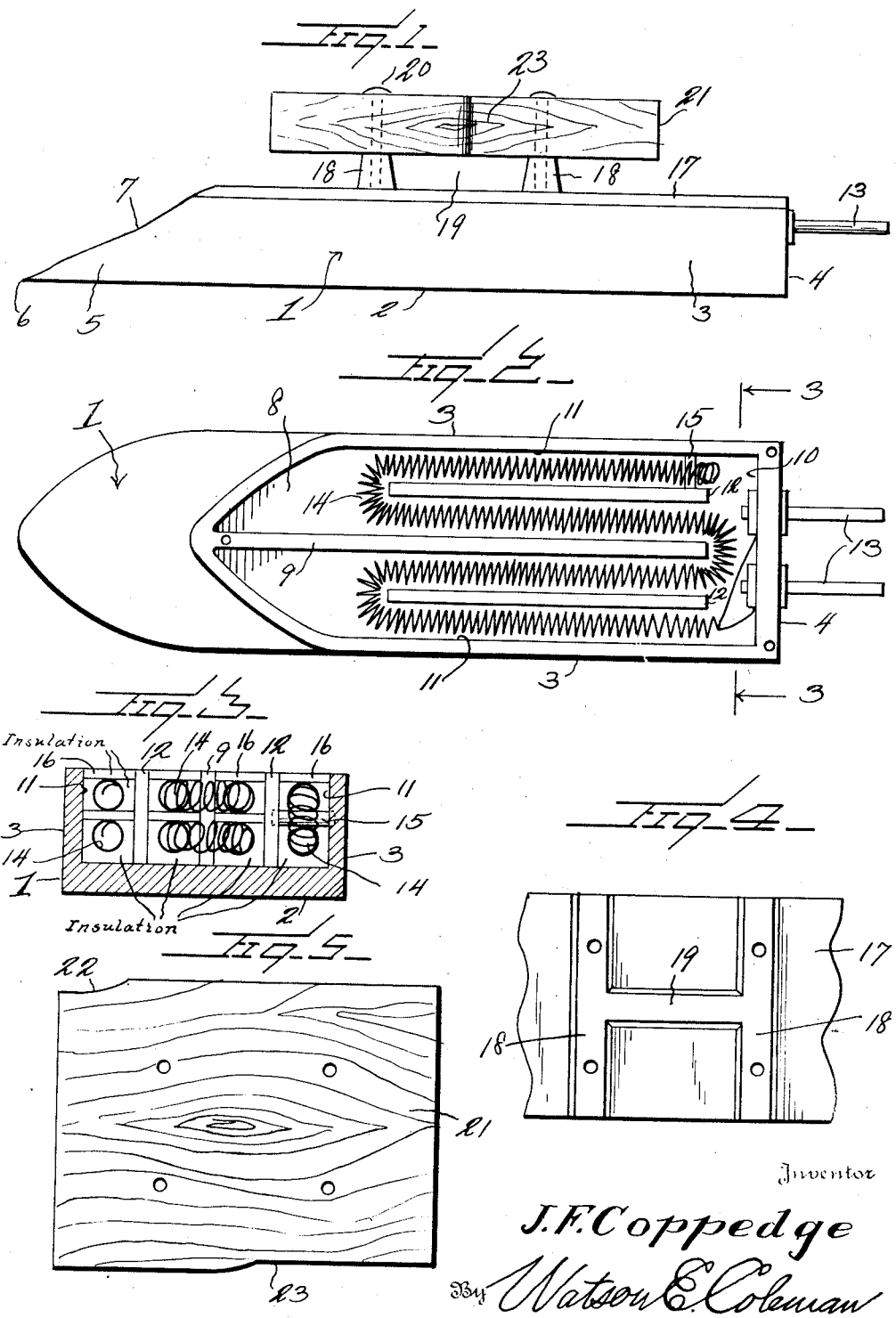
Inventor
J. F. Coppedge
By Watson E. Coleman
Attorney Patented Oct. 15, 1940

2,218,420

UNITED STATES PATENT OFFICE 2,218,420

LEADING IRON

James F. Coppedge, Clayton, Ga.

Application November 30, 1939, Serial No. 306,960

2 Claims. (Cl. 219—25)

This invention relates to improvements in electrically heated tools and pertains particularly to an improved leading tool.

The present invention has for its primary object to provide an improved electrically heated tool designed to be used in the automobile metal working trade to facilitate the application of body solder to the areas of the vehicle body which have been damaged and which are relatively inaccessible with ordinary tools, for the purpose of building up and repairing such damaged areas, the tool being designed also so that it will attain and hold a degree of heat which is proper for softening and spreading or smoothing the solder without breaking down or melting the body of solder to an extent which would cause the same to run.

Another object of the invention is to provide an electrically heated leading tool of the character stated, which comprises a solid body unit having a novelly arranged resistance coil enclosing chamber associated with a pointed solid part of the unit which is shaped so as to facilitate the working of lead in and over areas which are difficult to reach or which could not be satisfactorily covered by tools of the type at present used.

A further object of the invention is to provide in an electrically heated tool of the character stated which is so designed and which is provided with a handling means so connected with the body of the tool, that the tool may be easily inserted into restricted places and handled with a minimum of inconvenience in the process of applying and spreading or smoothing the solder with which the damaged area of a motor vehicle body is built up.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a view in side elevation of the implement embodying the present invention.

Fig. 2 is a view in plan of the same with the cover removed and showing the heating unit without the insulation.

Fig. 3 is a sectional view on the line 3—3 of Fig. 2, showing the heating unit in the insulation material.

Fig. 4 is a view in plan of the central portion of the cover with the handle removed.

Fig. 5 is a view in plan of the handle.

Referring now more particularly to the drawing, the numeral 1 generally designates the body of the tool, comprising the present invention. This body is preferably cast in a solid piece, of aluminum and it is relatively long in design, having a flat under surface 2, the vertical longitudinally extending side walls 3 and a vertical transversely extending rear or back wall 4. The forward end of the body is tapered off to form a blunt nose 5, the side walls 3 converging toward the front end of the body to form this nose and the extreme tip of this nose portion is formed to provide the relatively sharp transverse edge 6 which results from the downward and forward inclination of the top surface of the nose portion, such inclined top surface being indicated at 7.

In the top of the body 1 there is formed the chamber 8 which extends from the rear and high point of the inclined nose surface 7 to the opposite end of the body, this chamber being of a width substantially equaling the width of the body. Extending from the forward end of the chamber 8 along the longitudinal center of the body is a cast central division fin 9 which terminates short of the rear wall 10 of the chamber and between this central rib 9 and the two side walls 11 of the chamber are disposed the shorter longitudinally extending division fins 12 which are parallel with the fin 9 and are midway between this fin and the adjacent chamber wall.

The rear end of the body has secured therein and extending therethrough into the chamber 8, the terminal pins 13, these pins being, of course, insulated from the body 1, and within the chamber 8 these pins are electrically connected with the ends of a coiled resistance wire 14. This resistance wire extends from one pin 13 toward and into the area between a fin 12 and the adjacent chamber wall 11 and is carried forwardly to and turned around the forward end of this fin and then brought rearwardly and is carried around the rear end of the center fin 9, after which it is again carried forwardly and carried around the forward end of the other fin 12 and carried rearwardly to the end of this other fin where it is passed around the horizontal pin 15 to be reversed so as to then extend forwardly between the adjacent fin and wall 12—11 to follow the previously described path so that it may be brought back to the starting point and electrically connected with the other terminal 13. There are thus provided two layers of coiled resistance wire disposed one above the other and formed from a single length of resistance material, these lengths and layers of the coiled resistance wire being enclosed in suitable insulation material 16.

The chamber 8 is closed by a cover plate 17 which is generally of the same shape as the body and terminates at its forward end at the forward end of the chamber, the forward end edge of the cover plate being beveled off to aline with the inclined surface 7.

The top of the plate 17 at substantially its transverse center is provided with the two upstanding and transversely extending fins 18 which are connected by a central fin 19 which runs longitudinally of the cover plate on the longitudinal center of the same. These fins are provided with suitable screw or stud bolt receiving apertures for the reception of the screws or bolts 20 which are passed through the handle body 21 which rests upon the supporting fins 18—19. This handle 21 is shaped slightly to conform to some extent to the hand so that the use of the tool will not be made tiresome for the mechanic, by provision at one side of the handle adjacent its forward end of the cut in or inset area 22, while substantially the rear half of the opposite edge is inset as indicated at 23, this last inset being formed for the reception of the thumb and adjacent part of the hand, whereas the first-mentioned inset receives the base part of the index finger.

By the provision of the present tool, an important asset is made to the metal working trade in that it provides an implement which not only speeds up the operations of the craftsman but eliminates dangers of fire which are ever present in the method now used in the majority of motor vehicle body repair shops. The present tool is also economical to operate both as to the current consumed and as to the amount of material used.

In the use of the tool herein described, after the relatively thick body of the tool has become heated to the proper degree, an application is made to the surface to be leaded or tinned, of acid core solder by placing the solder against the surface and applying the heated tool so as to melt down the solder and cause it to adhere to the surface. After a sufficient quantity of the acid solder has been applied, there is then applied to such surface a quantity of the solder which is to be employed for building up the surface and this solder is then spread over the surface by applying the tool and moving it over the solder until the same has become thoroughly covered or tinned. After the tinning operation, the operation is completed by the application of the body solder. This is carried out by laying on the tinned surface a stick of the body solder and again applying the tool directly to the body solder as before. As soon as the stick of lead or stick of body solder has become sufficiently softened, the craftsman then proceeds to iron out the lead to the desired smoothness, continually moving the tool over the lead body so that at no time will the solder be subjected to an amount of heat which would melt it down to a condition where it might run. By continuously moving the tool, the body solder may be kept sufficiently soft to be ironed out into the desired shape and thus the body surface may be built up easily even where the area to which the lead is being applied, is vertically disposed.

What is claimed is:

1. A leading tool of the character stated, comprising a relatively long and narrow body of metal of substantially rectangular cross-sectional design and having a flat bottom surface and vertical side walls, said side walls at one end of the body converging to a point, the body having a downwardly and forwardly inclined top surface at the pointed end which joins said pointed end to form a sharp transversely extending edge, a chamber formed longitudinally in and opening through the top of the body, a plate removably secured over said chamber, electric resistance heating wires within said chamber, means for conducting current to said wires, a pair of upstanding ribs secured to the top surface of said cover plate, and a handle secured upon the tops of said ribs, said chamber having a central division fin extending from its forward end to and terminating short of its rear end and having intermediate fins between the central fin and the side walls, the said intermediate fins terminating at both ends short of the end walls of the chamber, and said resistance heating wires being passed back and forth in said chamber in flat loops spaced apart by said fins.

2. A leading tool, comprising an elongated body of metal having side walls and a flat bottom surface, the walls at one end converging to a point, the body having a downwardly and forwardly inclined top surface at the pointed end which joins said end to form a relatively sharp transversely extending edge, the body having a chamber opening through the top thereof, a cover plate secured over said chamber, a handle secured to said plate, electrical resistance heating wires within the chamber, said chamber having a central division fin extending from one end to and terminating short of the other end and having intermediate fins between the central fin and the side walls, the intermediate fins terminating at both ends short of the chamber end walls, said resistance wires being passed back and forth in the chamber in flat loops spaced apart by said fins, and means for conducting current to said wires.

JAMES F. COPPEDGE.